No. 685,872. Patented Nov. 5, 1901.
S. N. SANFORD.
WEED EXTRACTOR.
(Application filed Mar. 28, 1901.)
(No Model.)
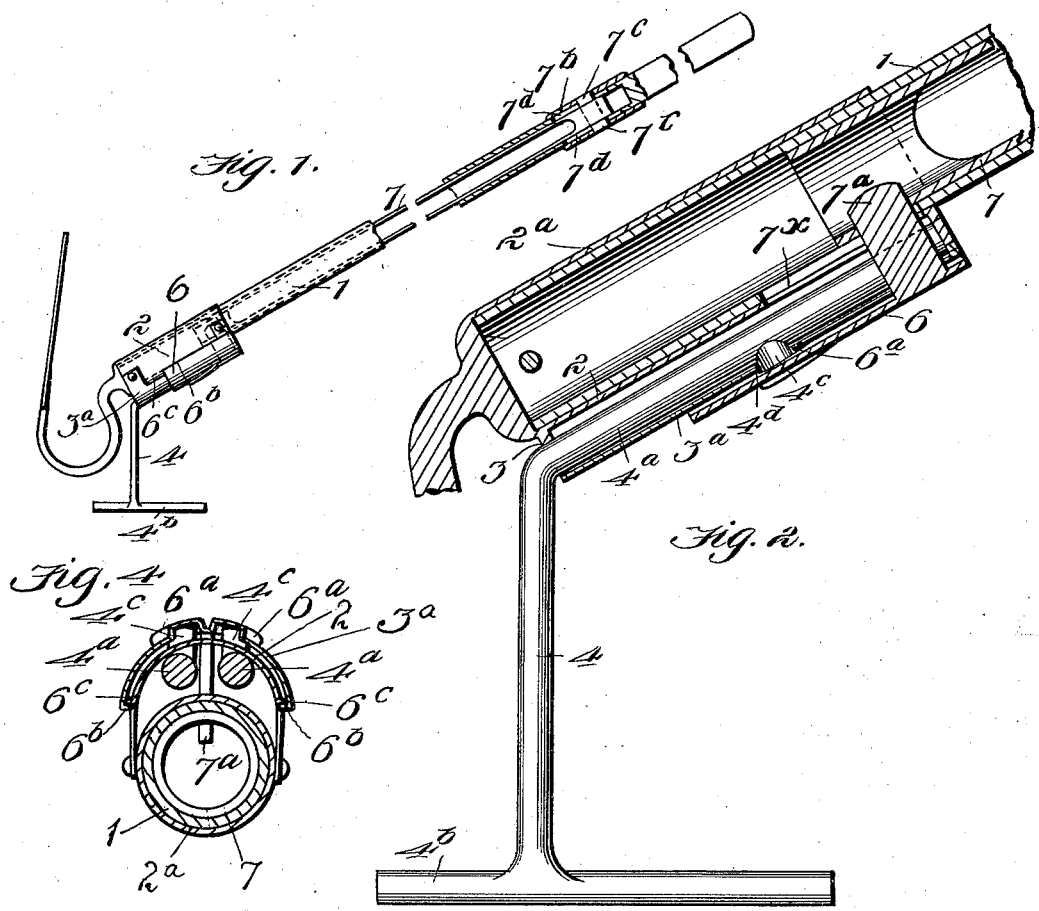
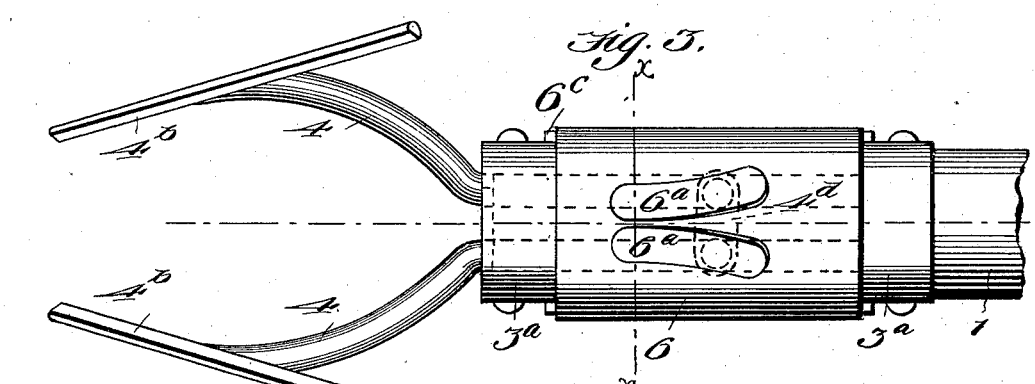
Witnesses
Inventor:
Scott N. Sanford
by
Attorney

UNITED STATES PATENT OFFICE.

SCOTT N. SANFORD, OF KALISPELL, MONTANA.

WEED-EXTRACTOR.

SPECIFICATION forming part of Letters Patent No. 685,872, dated November 5, 1901.

Application filed March 28, 1901. Serial No. 53,235. (No model.)

*To all whom it may concern:*

Be it known that I, SCOTT N. SANFORD, a citizen of the United States, residing at Kalispell, in the county of Flathead and State of Montana, have invented certain new and useful Improvements in Weed-Extractors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new and useful improvement in gardening implements, more especially for weeding purposes, and may be and is used in connection with garden-hoes. It is adapted to enable the ready pulling of weeds in cultivating gardens or elsewhere, as in hoeing the ground. It also renders the operation less burdensome in relieving the operator from excessive stooping. It is simple, cheaply manufactured, and readily handled.

It consists of the novel features of construction and their combination and arrangement, substantially as hereinafter more fully disclosed, and specifically pointed out by the claims.

In the accompanying drawings, illustrating the preferred embodiment of my invention, Figure 1 is a side view thereof as applied for use with a hoe. Fig. 2 is a longitudinal section of the weeder detached from the hoe. Fig. 3 is an inverted plan view of the same. Fig. 4 is a transverse section taken through the implement on the line $x\ x$ of Fig. 3.

In carrying out my invention I provide a preferably tubular head $2^a$, fitted upon the hoe-handle 1, also preferably tubular, said head having cast therewith at its extreme forward end the hoe-blade shank, also integral with the blade. To the under side of said head is applied and suitably secured a preferably concavo-convex bearing-plate 2. Within suitable sockets 3, formed in said plate, are inserted the pivoting cylindric extensions $4^a$ of the arms 4 of the weeding device. The sockets 3, together with the pivoting extensions $4^a$ of said weeding device, are housed by an additional recessed plate $3^a$, conformed to the surface of said plate 2 and suitably secured in place. The arms 4 have their lower ends formed with jaws $4^b$, adapted to engage and pull, when brought effectively together, the weed as the operator otherwise suitably manipulates the implement. The arms 4 are also preferably curved away from each other and arranged at such an angle to their pivoting extensions $4^a$ as that when the implement is being used they (said arms) will provide for readily causing their jaws $4^b$ to engage and grip the weed preparatory to its extraction, said arms standing normally perpendicular to the surface, while the pivoting extensions stand at the required inclination for conveniently manipulating the implement to extract the weeds.

The axial portions $4^a$ of the arms of the weeding device are provided with short studs $4^c$, one on each arm, passing through a common transverse slot $4^d$, made about centrally in the bearing-plate 2 and engaged by the divergent grooves $6^a\ 6^a$ of a slide 6, adapted to be actuated by the operator, as will presently appear. The slide 6 has preferably inturned lateral edges $6^b$, passed through lateral longitudinal slots $6^c$, formed between the two plates 2 $3^a$, preferably as shown. Said lateral edges $6^b$ engage the opposite upper edges of the lower plate $3^a$, thus holding said slide in position and permitting it to be moved a sufficient distance for the proper actuation of the arms of the weeding device, as in opening and closing the jaws in extracting the weeds. Suitable means for actuating said slide may comprise a preferably hollow rod 7, suitably connected thereto, as by a pin $7^a$, preferably integral with said slide and passed through longitudinal slots $7^x$ in the ferrule and hoe-handle, respectively, and let into said rod. The outer end of said rod is connected up, preferably, with a slide $7^b$, fitted upon the outside of the hoe-handle by a transverse pin $7^c$, passing through said rod and engaging longitudinal slots $7^d$ in said hoe-handle, whereby by the application of the hand to said slide, which is readily effected, the weeding implement can be actuated, the hoe-blade then being inverted.

Having thus fully described my invention, what I claim, and desire to secure by Letters Patent, is—

1. A device of the character described, comprising a pair of jaws, a bearing for the arms of said jaws, a slide adapted to actuate said jaws so as to move them laterally together or away from each other, and means for actuating said slide, substantially as set forth.

2. A device of the character described, comprising a pair of jaws normally standing perpendicularly, with their carrying-arms deflected therefrom and having pivotal connection with a bearing-plate on an implement-handle and a suitably-actuated slide arranged in connection with the implement-handle, and having divergent grooves engaging studs of said arms, and means for actuating said slide, substantially as set forth.

3. A device of the character described, comprising a pair of jaws with their pivoted carrying-arms curved away from each other and standing perpendicularly, and the pivotal portions of said arms at an angle thereto, said pivotal portions having studs passed through a transverse slot of the bearing of said pivotal portions, a slide having divergent grooves adapted to receive said studs, and a rod connected up with said slide to actuate the same, substantially as set forth.

4. A device of the character described, comprising a pair of jaws with their pivoted carrying-arms bowed or curved away from each other and standing perpendicularly, and the pivotal portions of said arms at an angle thereto, said pivotal portions having studs passed through a transverse slot of the bearing of said pivotal portions, a bearing-plate, a slide having divergent grooves adapted to receive said studs, and a rod connected up with said slide to actuate the same, said slide having lateral inturned edges passed through lateral slots between said bearing-plate and an additional plate, and engaging the longitudinal edges of said additional plate, substantially as set forth.

5. A device of the character described, comprising a pair of jaws with their pivoted arms standing perpendicularly and the pivotal portions thereof arranged at an angle thereto, a slide connected up with said pivotal portions to effect the actuation of said jaws, and having a stud extended into the handle of the implement, and a rod engaging said stud and having a sleeve connected therewith and arranged exteriorly of said handle, substantially as set forth.

In testimony whereof I affix my signature in presence of two witnesses.

SCOTT N. SANFORD.

Witnesses:
   EDWD. J. UNDERWOOD,
   GEORGE F. RAINEY.